United States Patent [19]

Burnett

[11] Patent Number: 4,723,573

[45] Date of Patent: Feb. 9, 1988

[54] STORAGE TANK SAFETY PRESSURE RELIEF METHODS AND SYSTEMS

[75] Inventor: Don E. Burnett, Villa Park, Ill.

[73] Assignee: Phillips Petroleum Company, Bartlesville, Okla.

[21] Appl. No.: 810,768

[22] Filed: Dec. 19, 1985

[51] Int. Cl.$^4$ .............................................. F17C 13/12
[52] U.S. Cl. .................... 137/587; 137/571; 62/54
[58] Field of Search ............... 137/571, 572, 557, 587; 62/54; 220/85 VR, 85 VS; 200/81 R

[56] References Cited

U.S. PATENT DOCUMENTS

| | | | |
|---|---|---|---|
| 1,432,111 | 10/1922 | Lewis | 137/572 |
| 1,689,352 | 10/1928 | Maxon | 220/85 VR |
| 1,733,575 | 10/1929 | Broido | 137/572 |
| 2,302,234 | 11/1942 | Marner | 220/85 VS |
| 2,400,037 | 5/1946 | Arndt et al. | 62/54 |
| 2,502,525 | 4/1950 | Krugler | 62/1 |
| 2,645,906 | 7/1953 | Ryan | 62/1 |
| 2,696,831 | 12/1954 | Malick | 137/505 |
| 2,731,802 | 1/1956 | MacSporran | 62/1 |
| 2,732,687 | 1/1956 | Brandon | 62/54 |
| 3,196,623 | 7/1965 | Kelly | 62/54 |
| 3,223,118 | 12/1965 | Hutelmyer | 137/572 |
| 3,520,329 | 7/1970 | Weber | 137/571 |
| 3,610,220 | 10/1971 | Sunto-Gunn | 123/136 |
| 3,764,036 | 10/1973 | Dale et al. | 220/15 |
| 3,804,291 | 4/1974 | Fricker | 220/85 R |
| 4,007,343 | 2/1977 | Alten | 200/81 R X |
| 4,142,470 | 3/1979 | Zauss | 105/26 R |
| 4,223,692 | 9/1980 | Perry | 137/557 X |
| 4,232,698 | 11/1980 | Hosterman et al. | 137/557 X |
| 4,350,018 | 9/1982 | Frank et al. | 62/54 |

Primary Examiner—Alan Cohan
Assistant Examiner—John Rivell
Attorney, Agent, or Firm—Laney, Dougherty, Hessin & Beavers

[57] ABSTRACT

An improved safety pressure relief system for volatile liquid storage tanks is provided. A pressure relief valve is connected to the storage tank so that when the pressure within the storage tank reaches a predetermined high level, vapors are vented therefrom by way of the outlet of the relief valve. A container for containing pressurized vapors having an inlet and a closed outlet is provided, and conduit means are connected between the relief valve outlet and the inlet of the container for conducting vapors vented by the relief valve to within the container. Means for indicating the presence of vapors within the container are attached thereto.

9 Claims, 5 Drawing Figures

U.S. Patent  Feb. 9, 1988  4,723,573
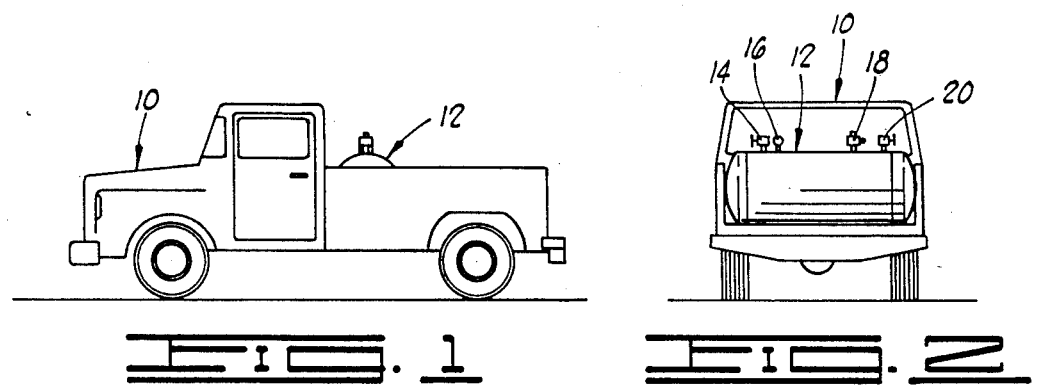
FIG. 1
FIG. 2
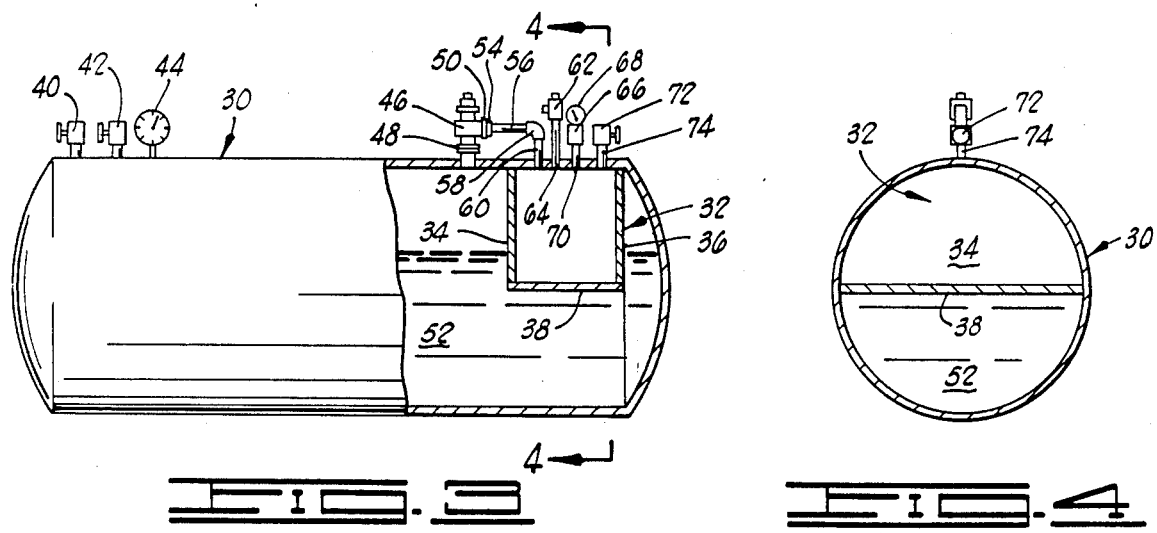
FIG. 3
FIG. 4
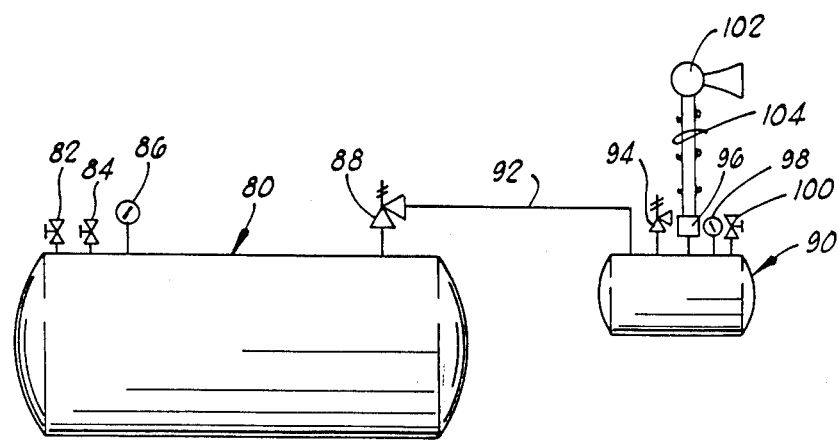
FIG. 5

STORAGE TANK SAFETY PRESSURE RELIEF METHODS AND SYSTEMS

BACKGROUND OF THE INVENTION

1. Field of the Invention

The present invention relates generally to storage tank safety pressure relief methods and systems, and more particularly, to methods and systems for preventing overpressure conditions in storage tanks containing pressurized volatile liquids whereby vapors vented from the storage tanks are prevented from entering the atmosphere.

2. Background of the Invention

Pressurized volatile liquids such as nitrogen, hydrogen, ammonia, carbon dioxide and hydrocarbons, e.g., ethylene and liquified petroleum gases (LPG), are commonly transported or stored in tank cars, tank trailers and other storage tanks. For example, in areas where natural gas is unavailable, LPG is often utilized for the heating of homes and places of business, and each home or place of business includes one or more permanent LPG storage tanks located nearby. LPG storage tanks are also mounted on vehicles, such as pickup trucks, for supplying fuel to the engines thereof which have been converted for propane use. The term "storage tank" is used hereinafter to mean any closed container or tank utilized for containing a pressurized volatile liquid.

Most, if not all, storage tanks for containing volatile liquid are equipped with conventional pressure relief valves for preventing overpressure. That is, if a predetermined pressure level is reached within the storage tanks, the pressure relief valves communicated therewith open whereby vapors are vented to the atmosphere. While such venting of vapors to the atmosphere relieves pressure from the storage tanks and prevents dangerous overpressure, it often produces the adverse result of polluting the atmosphere and creating fire and explosion hazards. For example, if an LPG storage tank is over-filled with LPG and allowed to be heated by the sun or otherwise, a pressure level can quickly be reached within the storage tank which causes the pressure relief valve connected thereto to open and LPG vapors to be vented to the atmosphere. Numerous fires and explosions have occurred as a result of such vented LPG vapors being accidentally ignited. Thus, there is a need for a volatile liquid storage tank safety pressure relief method and system whereby when pressure is relieved from a storage tank by the venting of vapors therefrom due to over-filling, heating, etc., the vented vapors are prevented from entering the atmosphere.

SUMMARY OF THE INVENTION

Volatile liquid storage tank safety pressure relief methods and systems are provided. The systems are basically each comprised of a pressure relief valve having an inlet and an outlet, the inlet being connected to a volatile liquid storage tank so that when the pressure within the storage tank reaches a predetermined level, vapors are vented therefrom by way of the outlet of the relief valve. A container for containing pressurized vapors having an inlet and a closed outlet is provided, and conduit means are connected between the relief valve outlet and the inlet of the container for conducting vapors vented by the relief valve to within the container. Means for indicating the presence of pressurized vapors within the container are attached thereto.

It is, therefore, a general object of the present invention to provide improved volatile liquid storage tank safety pressure relief methods and systems.

A further object of the present invention is the provision of a method and system for protecting volatile liquid storage tanks against overpressure whereby pressure is relieved from such storage tanks by venting vapors therefrom and in the normal case the vapors are prevented from entering the atmosphere.

Another object of the present invention is the provision of a storage tank safety pressure relief method and system whereby when pressure is relieved and vapors are vented from a storage tank, the vapors are at least initially prevented from entering the atomsphere and a warning indication is given whereby remedial action can be taken to prevent further pressure relief and the entry of vented vapors into the atmosphere.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side elevational view of a vehicle having a heretofore used LPG storage tank with pressure relief valve mounted thereon.

FIG. 2 is an elevational view from the rearward end of the vehicle of FIG. 1.

FIG. 3 is a side partly sectional elevational view of a volatile liquid storage tank including the safety pressure relief system of the present invention.

FIG. 4 is a cross-sectional view taken along line 4—4 of FIG. 3.

FIG. 5 is a diagrammatic view of a volatile liquid storage tank including an alternate form of the safety pressure relief system of the present invention.

DESCRIPTION OF THE PREFERRED EMBODIMENT

Referring now to the drawings, and particularly to FIGS. 1 and 2, a vehicle 10 is illustrated having an LPG storage tank 12 mounted thereon. In the usual case, the vehicle is a pickup as shown, and the storage tank 12 contains pressurized liquid propane. As shown in FIG. 2, the propane storage tank 12 has heretofore typically included a fill shut-off valve 14, a pressure gauge 16, a pressure relief valve 18 and a vent shut-off valve 20 attached thereto. In operation, when the pressure within the storage tank 12 reaches a predetermined high level, the relief valve 18 attached thereto opens whereby vapors are vented to the atmosphere and pressure is relieved. Other volatile liquid storage tanks, including tank cars and tank trailers, have generally been equipped for over-pressure protection in the manner described above prior to the present invention.

Referring now to FIGS. 3 and 4, one form of volatile liquid storage tank including the safety pressure relief system of the present invention is illustrated and generally designated by the numeral 30. The storage tank 30 is particularly suitable for use as an LPG storage tank for vehicles, but it can also be utilized in other mobile or permanent LPG or other volatile liquid storage applications. The storage tank 30 is a horizontally positioned cylindrical tank closed at both ends by the usual eliptical heads. Disposed within the tank is a separate sealed compartment 32 formed by a pair of vertical walls 34 and 36 and a bottom wall 38. The vertical walls 34 and 36 are semicircular in shape and are seal welded to internal surfaces of the storage tank 30. The bottom wall 38 is seal welded to opposite sides of the storage tank 30 and to the bottom ends of the vertical walls 34 and 36. As will be understood, the particular shapes of the storage tank 30 and the container 32 disposed therewithin are not critical and other convenient shapes can be utilized.

The storage tank 30 includes the customary fill and vent shut-off valves 40 and 42, a pressure gauge 44 and a pressure relief valve 46 which are sealingly connected to openings in the tank by conventional fittings. The pressure relief valve 46 is conventional in its operation and includes an inlet connection 48 communicated with the interior of the storage tank 30 and a discharge connection 50. When the pressure of vapors in the upper section of the storage tank 30 reaches a predetermined high level, the relief valve 46 opens whereby a portion of the vapors within the storage tank 30 are vented therefrom to thereby relieve pressure (lower the pressure) within the tank 30.

In accordance with the present invention, openings are provided in the wall of the storage tank 30 which communicates with the interior of the container 32 disposed therein. The discharge connection 50 of the relief valve 46 is sealingly connected by conduits and fittings to one of the openings communicating with the interior of the container 32. More specifically, the discharge connection 50 of the relief valve 46 is connected to a companion flange 54; in turn connected to a conduit section 56; in turn connected to an elbow fitting 58; in turn connected to a conduit section 60 which is sealingly attached within the opening communicating with the container 32. A second relief valve 62 is connected to a conduit section 64 which is connected within a second opening communicating with the interior of the container 32. A pressure transducer 66 and pressure gauge 68 are connected together and to a conduit section 70 which is connected within a third opening communicating with the container 32. Finally, a shut-off valve 72 is connected to a conduit section 74 which is sealingly connected within a fourth opening communicating with the compartment 32.

In operation of the storage tank 30 and the improved safety pressure relief system of this invention, a portion of the total volume of the storage tank 30 is filled with a body 52 of volatile pressurized liquid, e.g., LPG, by way of the shut-off valve 40. The space above the body of pressurized liquid 52 is filled with pressurized vapors and the pressure level exerted within the storage tank 30 is indicated by the pressure gauge 44. When the pressure within the storage tank 30, for whatever reason, increases to the predetermined high level at which the pressure relief valve 46 is set, i.e., a pressure level just below or at the working pressure of the storage tank 30, the relief valve 46 opens whereby vapors are vented from the interior of the storage tank 30 to thereby prevent an overpressure condition from existing therein. The pressurized vapors vented from the interior of the storage tank 30 by way of the relief valve 46 are conducted by the fittings and conduit sections 54, 56, 58 and 60 to the interior of the container 32 disposed within the storage tank 30. The presence of the pressurized vapors within the container 32 is indicated by the pressure gauge 68 and pressure transducer 66 communicated therewith. The pressure transducer 66 can be connected to various forms of indicating or alarm means (not shown) located remotely therefrom. For example, the pressure transducer 66 can be electrically connected to an alarm light and/or buzzer located in a place likely to attract attention such as in the cab of a vehicle when the storage tank 30 is mounted on a vehicle.

When the presence of pressurized vapors in the container 32 is indicated, remedial steps can be taken to prevent further venting of pressurized vapors into the container 32 such as by cooling the storage tank 30 or venting pressurized vapors therefrom to a separate receptacle for such vapors by way of the vent valve 42 and a hose or other conduit means (not shown) removably connected thereto. Once the venting of vapors into the container 32 has been terminated, the pressurized vapors contained therein can be removed therefrom by way of the vent valve 72. That is, the vent valve 72 can be connected to a receptacle for pressurized vapors by way of a removable hose (not shown) connected thereto.

Generally, the presence of pressurized vapors in the container 32 will be indicated and the condition causing the venting of vapors into the container 32 by way of the relief valve 46 corrected prior to an overpressure condition being reached within the container 32. However, in the event that such an overpressure condition is reached within the container 32, the relief valve 62 communicated with the interior of the container 32 will operate to relieve such pressure.

Referring now to FIG. 5, an alternate safety pressure relief system of the present invention is illustrated diagrammatically. The system of FIG. 5 is particularly suitable for use with existing permanently installed volatile liquid storage tanks such as LPG storage tanks. Such a storage tank is designated in FIG. 5 by the numeral 80, and includes the usual fill and vent shut-off valves 82 and 84, a pressure gauge 86 and a pressure relief valve 88. A separate container 90 is provided for containing pressurized vapors which can take various forms such as the horizontal cylindrical storage tank illustrated. The discharge connection of the relief valve 88 connected to the storage tank 80 is connected by a conduit 92 to an inlet connection in the container 90. Attached to and communicated with the interior of the container 90 is a second relief valve 94, a pressure transducer 96, a pressure gauge 98, and a vent shut-off valve 100.

The method of the present invention for relieving pressure from a volatile liquid storage tank while preventing all or at least most of the vented vapors from entering the atmosphere is carried out by the system illustrated in FIG. 5 in the same manner as the system illustrated in FIGS. 3 and 4. That is, when the pressure exerted within the storage tank 80 reaches a predetermined high level, the relief valve 88 opens whereby pressurized vapors are vented from the storage tank 80 by way of the relief valve 88. The conduit 92 conducts the pressurized vapors to the container 90 and the presence of pressurized vapors therein is indicated by the pressure gauge 98 as well as the pressure transducer 96 which is operably connected to a horn or other similar alarm 102 by an electric circuit 104. Once the condition causing the relief valve 88 to operate has been abated, the pressurized vapors within the tank 90 can be removed to a receiver therefor by way of the valve 100.

Thus, by the method and system of the present invention the pressurized vapors vented as a result of an overpressure condition in a volatile liquid storage tank are contained while an indication of the overpressure condition is given. If the overpressure condition is not abated and the container for vented pressurized vapors itself reaches an overpressure condition, the second relief valve attached to the container will prevent the rupture of the container or the storage tank connected thereto. However, in most cases, the indication of an overpressure condition by the presence of pressurized vapors in the container will cause remedial action to be taken and the venting of vapors to the atmosphere to be prevented.

Thus, the present invention is well adapted to carry out the objects and attain the ends and advantages mentioned as well as those inherent therein. While numerous changes in the construction and arrangement of parts can be made by those skilled in the art, such changes are encompassed within the spirit of this invention as defined by the appended claims.

What is claimed is:

1. In a safety pressure relief system for a LPG storage tank mounted on a vehicle wherein a pressure relief valve for automatically venting vapors from said storage tank to the atmosphere when overpressure conditions in said tank occur is connected to said tank, the improvement which comprises:
    a container mounted on said vehicle for containing pressurized LPG vapors, said container having an inlet and a closed outlet;
    conduit means connected between said relief valve and said inlet of said container for conducting vapors automatically vented by said relief valve to within said container; and
    means for indicating the presence of vapors within said container attached thereto whereby remedial steps can be taken to prevent further venting of said vapors by said relief valve and said vapors present within said container can be removed therefrom through said closed outlet thereof to a location separate from said container and said storage tank.

2. The safety pressure relief system of claim 1 wherein said means for indicating the presence of vapors within said container comprises a pressure gauge.

3. The safety pressure relief system of claim 1 wherein said means for indicating the presence of vapors within said container comprises a pressure transducer operably connected to an alarm.

4. The safety pressure relief system of claim 3 wherein said alarm is positioned in said vehicle to attract the attention of the operator thereof.

5. The safety pressure relief system of claim 1 which is further characterized to include a second pressure relief valve connected to said container.

6. In a safety pressure relief system for a LPG storage tank mounted on a vehicle wherein a pressure relief valve for automatically venting vapors from said storage tank to the atmosphere when overpressure conditions in the tank occur is connected to the tank, the improvement which comprises:
    a container disposed within said storage tank mounted on said vehicle for containing pressurized LPG vapors, said container having an inlet and a closed outlet;
    conduit means connected between said relief valve and said inlet of said container for conducting vapors automatically vented by said relief valve to within said container; and
    means for indicating the presence of vapors within said container attached thereto whereby remedial steps can be taken to prevent further venting of said vapors by said relief valve and said vapors present within said container can be removed therefrom through said closed outlet thereof to a location separate from said container and said storage tank.

7. In a method of continuously preventing overpressure conditions from occuring in a volatile liquid storage tank whereby vapors are vented from the storage tank by a pressure relief valve when the pressure therewithin reaches a predetermined level, the improvement which comprises:
    providing a container having a closed valve for containing pressurized vapors;
    conducting vapors from said pressure relief valve to said container when said vapors are vented by said relief valve;
    indicating the presence of vapors in said container when such vapors are contained therein;
    preventing further venting of said vapors from said storage tank by said relief valve;
    removing said vapors from said container when said vapors are present therein to a location separate from said container and said storage tank by opening said closed valve.

8. The method of claim 7 wherein said further venting of said vapors is prevented by cooling said storage tank.

9. The method of claim 7 wherein said further venting of said vapors is prevented by manually venting vapors from said storage tank.

* * * * *